US006669143B1

(12) United States Patent
Johnson

(10) Patent No.: US 6,669,143 B1
(45) Date of Patent: Dec. 30, 2003

(54) NON-ENCROACHING AIRCRAFT PASSENGER SEAT

(75) Inventor: Glenn A. Johnson, King, NC (US)

(73) Assignee: B E Aerospace, Inc., Wellington, FL (US)

( * ) Notice: Subject to any disclaimer, the term of this patent is extended or adjusted under 35 U.S.C. 154(b) by 0 days.

(21) Appl. No.: 10/305,849

(22) Filed: Nov. 27, 2002

(51) Int. Cl.⁷ .............................................. B64D 11/06
(52) U.S. Cl. ............................. 244/122 R; 244/118.6; 297/318; 297/340; 297/353
(58) Field of Search ......................... 244/122 R, 118.5, 244/118.6; 297/311, 318, 340, 353, 423.2–423.24

(56) References Cited

U.S. PATENT DOCUMENTS

| 2,257,103 | A | * | 9/1941 | Brokering | 244/122 R |
| 3,007,738 | A | * | 11/1961 | Gardel et al. | 297/423.2 |
| 4,790,496 | A | | 12/1988 | Marrujo | |
| 5,560,683 | A | | 10/1996 | Penley et al. | |
| 5,615,928 | A | | 4/1997 | Penley | |
| 5,636,898 | A | | 6/1997 | Dixon et al. | |
| 5,722,726 | A | * | 3/1998 | Matsumiya | 297/318 |
| 5,735,578 | A | | 4/1998 | Penley | |
| 6,419,318 | B1 | * | 7/2002 | Albright | 297/353 |

* cited by examiner

Primary Examiner—Galen L. Barefoot
(74) Attorney, Agent, or Firm—Adams Evans P.A.

(57) ABSTRACT

A passenger seat movable from an upright to a recline position without encroaching on an aft-seated passenger, and including a seat base for being attached to a supporting surface. A unitary seating element is provided and includes a pair of laterally-spaced apart seat frames carried by the seat base, the seat frames defining a curved shape corresponding to the profile of an anatomically-appropriate seat bottom and seat back. A curved, semi-rigid diaphragm support is carried between the seat frames in alignment with the curved shape of the seat frames and mounted for movement relative to the seat frames between a first, upright position and a second, reclined position. A diaphragm is positioned under tension on the diaphragm support for providing a continuous seat bottom and seat back support surface for a seat occupant. Stretchers are attached to and extend between opposite sides of the diaphragm support for maintaining the diaphragm support in a spaced-apart condition with the diaphragm in tension.

10 Claims, 10 Drawing Sheets

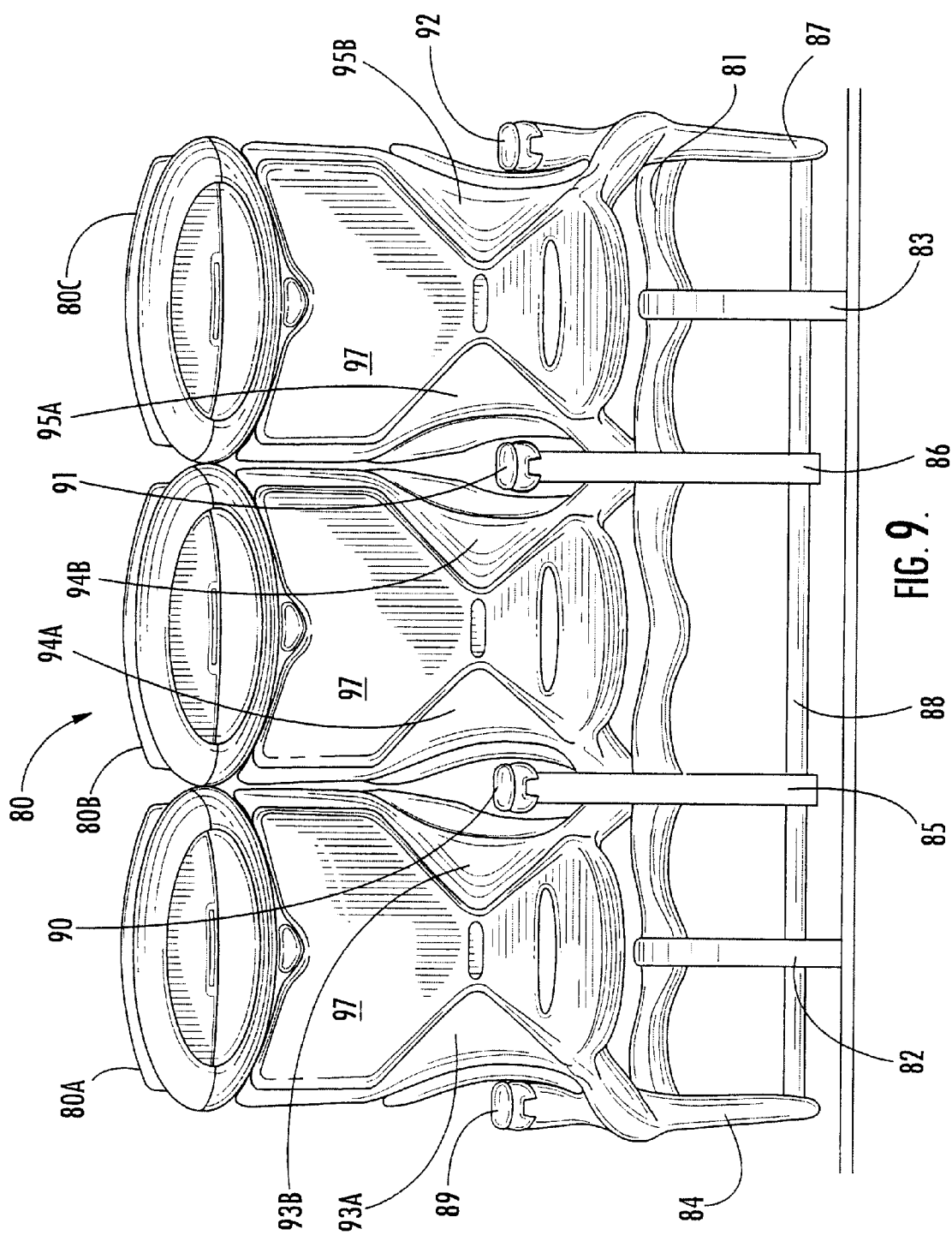

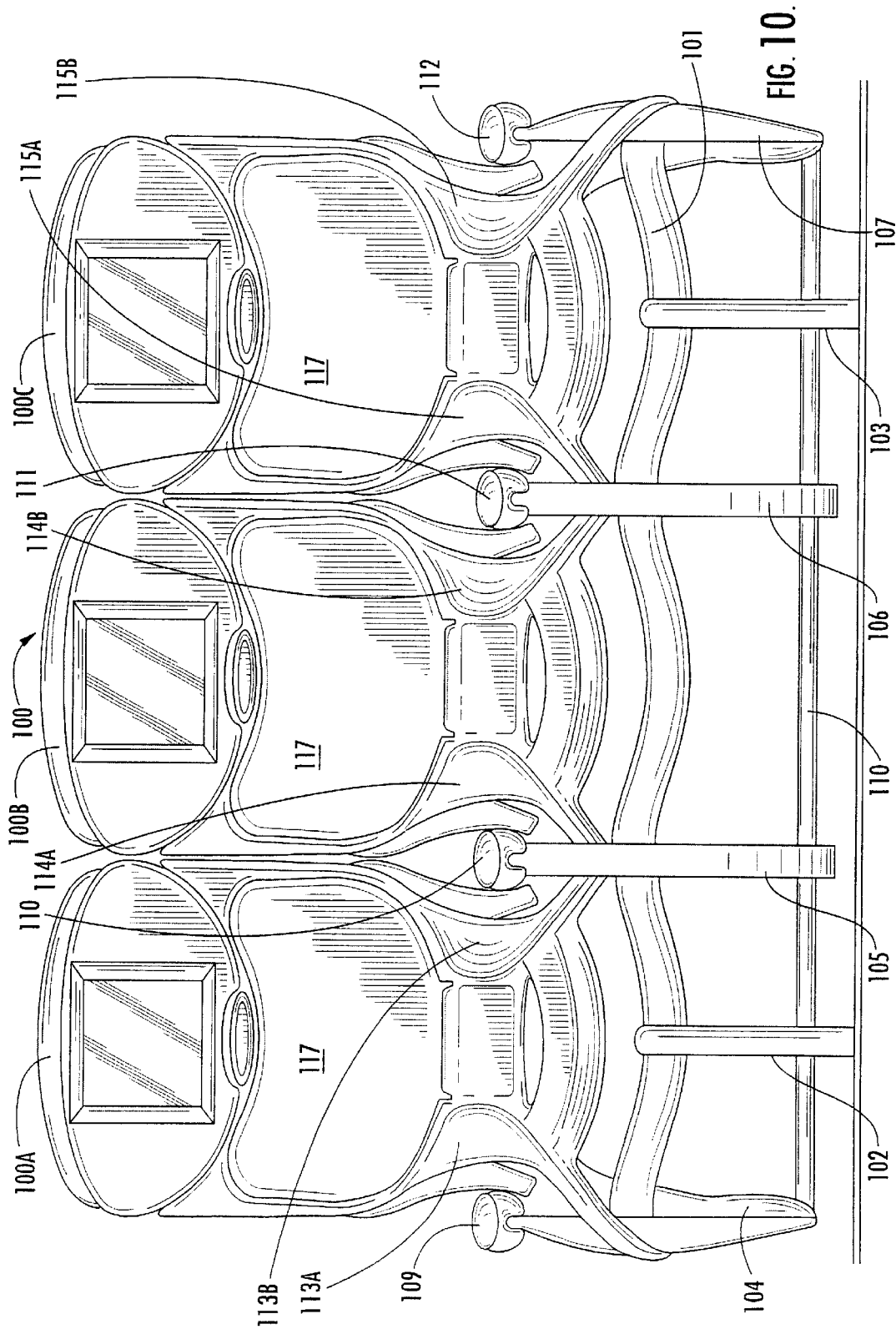

NON-ENCROACHING AIRCRAFT PASSENGER SEAT

TECHNICAL FIELD AND BACKGROUND OF THE INVENTION

This invention relates to a non-encroaching aircraft seat, particularly an aircraft passenger seat. Within the context of this application the term "non-encroaching" refers to a stationary seat back that allows the passenger seated therein to assume a reclined position without the seat back moving rearwardly into the space behind the seat, thus reducing the space available to the aft-seated passenger. Aircraft passenger seats are typically constructed from modular components, the size, weight and construction of which are dictated by many considerations, including fuselage dimensions, aesthetic and safety considerations. Many of these requirements are imposed by law or regulation. The lower seat chassis is constructed of leg modules, while the upper seat is constructed of section assembly modules. In prior art seating systems the leg modules and section assembly modules are connected by mounting both to a pair of parallel beams that extend laterally from one side of the seat or seat assembly to the other. The location of the upper seat section modules is controlled by the aircraft fuselage lines, statutory aisle requirements and carrier preferences within these parameters. The location of the leg modules is governed by the positions of the floor tracks that extend along the length of the fuselage and to which the seats are secured by track fittings on the bottom of the leg modules. The position of the floor tracks is generally fixed and permanent.

Within these requirements manufacturers of aircraft are constantly refining seat designs to achieve more comfort and utility within carrier-imposed restraints on cost, weight, maintenance down-time, and safety. One serious issue is the issue of encroachment of a forward-seated passenger on the space of an aft-seated passenger when the forward-seated passenger has reclined the seat. This is a source of irritation among passengers and can cause, for example, spilled food and drink, the inability of the inboard seated aft passengers to egress and ingress, and the inability for the aft-seated passenger to use the meal tray.

Conventional coach class seats are designed with a stationary seat bottom to which is attached a reclinable seat back. This causes the passenger to slide forward on the seat bottom as the seat back is reclined. Moreover, the amount of recline is subtracted from the space available to the aft-seated passenger. Such seats also have arm rests that pivot upwardly and downwardly from a point near the rear of the seat back, effectively widening the seat at a point behind where the arm of the forward-seated passenger bends at the elbow. Similar inefficiencies and wasted space result from the location of the seat base beams.

The present invention relates to a passenger seat that has improved comfort, enhanced space, simplified design, and lighter weight.

SUMMARY OF THE INVENTION

Therefore, it is an object of the invention to provide a passenger seat frame assembly that includes a minimum number of modular elements.

It is another object of the invention to provide a passenger seat frame assembly that permits a passenger to recline the seat back of the seat without encroaching on the space behind the seat back.

It is another object of the invention to provide a passenger seat frame assembly that has a single, integral seat back and seat bottom that provides comfort to the passenger in a light weight, simplified construction.

It is another object of the invention to provide a passenger seat frame assembly that has a single, integral seat back and seat bottom that permits a passenger to recline by rotation about an axis proximate the hips rather than by pivoting the back rearwardly, causing the hips to slide forwardly.

These and other objects of the present invention are achieved in the preferred embodiments disclosed below by providing a passenger seat movable from an upright to a recline position without encroaching on an aft-seated passenger, and including a seat base for being attached to a supporting surface. A unitary seating element is provided and comprises a pair of laterally-spaced apart seat frames carried by the seat base, the seat frames defining a curved shape corresponding to the profile of an anatomically-appropriate seat bottom and seat back. A curved, semi-rigid diaphragm support is carried between the seat frames in alignment with the curved shape of the seat frames and mounted for movement relative to the seat frames between a first, upright position and a second, reclined position. A diaphragm is positioned under tension on the diaphragm support for providing a continuous seat bottom and seat back support surface for a seat occupant. Stretchers are attached to and extend between opposite sides of the diaphragm support for maintaining the diaphragm support in a spaced-apart condition with the diaphragm in tension.

According to one preferred embodiment of the invention, a power assist assembly provides resistance against movement of the diaphragm support from the upright to the recline position and a power assist for movement of the diaphragm support from the recline to the upright position.

According to another preferred embodiment of the invention, the power assist assembly comprises a spring moved into compression as the diaphragm support move from the upright to the recline position and into extension as the diaphragm support move from the recline to the upright position.

According to yet another preferred embodiment of the invention, the diaphragm support is carried in alignment with the curved shape of the seat frames and mounted for movement relative to the seat frames by a plurality of spaced-part pairs of opposed rollers carried by the seat frames and between which the diaphragm support is captured for movement therebetween.

According to yet another preferred embodiment of the invention, a lock is provided for locking the diaphragm support in a desired position.

According to yet another preferred embodiment of the invention, the diaphragm comprises a fabric.

According to yet another preferred embodiment of the invention, the diaphragm support comprises carbon fiber material.

According to yet another preferred embodiment of the invention, a leg rest assembly is mounted proximate a front edge of the seat bottom and movable between a stowed position perpendicular to the seat bottom and a support position extending outwardly from the seat bottom and forming an extension thereof for supporting the legs of the passenger when the seat is in the recline position.

According to yet another preferred embodiment of the invention, at least two of the seats are attached together side-to-side to form a seat assembly.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 9 is a rear view of a three-seat assembly according to one embodiment of the invention; and FIG. 10 is a rear view of a three-seat assembly according to one embodiment of the invention.

DESCRIPTION OF THE PREFERRED EMBODIMENT AND BEST MODE

Figure 1:
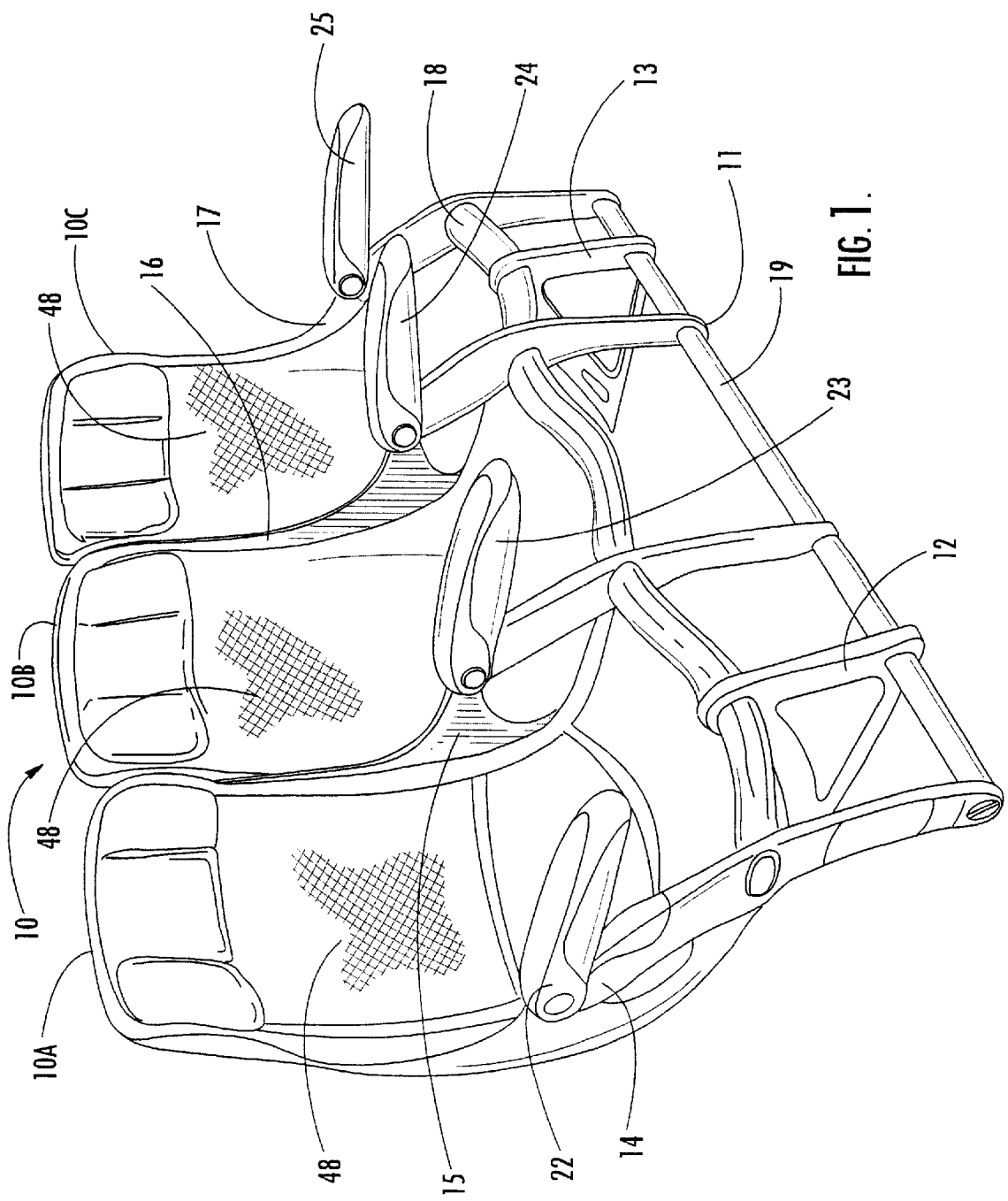
FIG. 1 is a perspective view of a three-seat assembly according to a preferred embodiment of the invention.

Referring now specifically to the drawings, a three-seat seat set according to the present invention is illustrated in FIG. 1 and shown generally at reference numeral 10 and comprises individual joined seats 10A, 10B, 10C that are movable from an upright to a recline position without encroaching on an aft-seated passenger. This type of seating is conventionally referred to as "coach" or "main cabin" seating as distinct from larger and more complex first class or business class seating. As will be seen below, the features of this invention are also applicable to first and business class seating. The seat set 10 includes a seat base 11. The seat base 11 includes a pair of leg assemblies 12 and 13 for being attached to a supporting surface by means of conventional track fittings such as disclosed in applicant's U.S. Pat. Nos. 4,776,533; 5,169,091 and 5,871,318. Four seat frames 14, 15, 16 and 17 are connected by single laterally-extending beam 18. A baggage guard rail 19 prevents baggage stowed under the seats 10A, 10B, 10C from sliding forward into the leg area of the passengers.

The beam 18 represents a radical departure from conventional seat design, where a pair of parallel fore-and aft beams provide support to the entire seat structure. The beam 18 is oval in cross-section and downwardly curved laterally across the front of each of the seats 10A, 10B, 10C. This combination of the oval cross-section and the curve provides sufficient strength to support the entire on the leg assemblies 12 and 13, thus eliminating the need for a second beam.

Each seat 10A, 10B, 10C thus includes a pair of the shared, laterally spaced-apart seat frames 14, 15, 16 and 17, each of which has a curved shape generally corresponding to the profile of an anatomically-appropriate generally horizontal seat bottom and generally vertical seat back, and includes an extension to the floor. Arm rests 22, 23, 24 and 25 are pivotally-mounted on respective seat frames 14, 15, 16 and 17.

Figure 2:
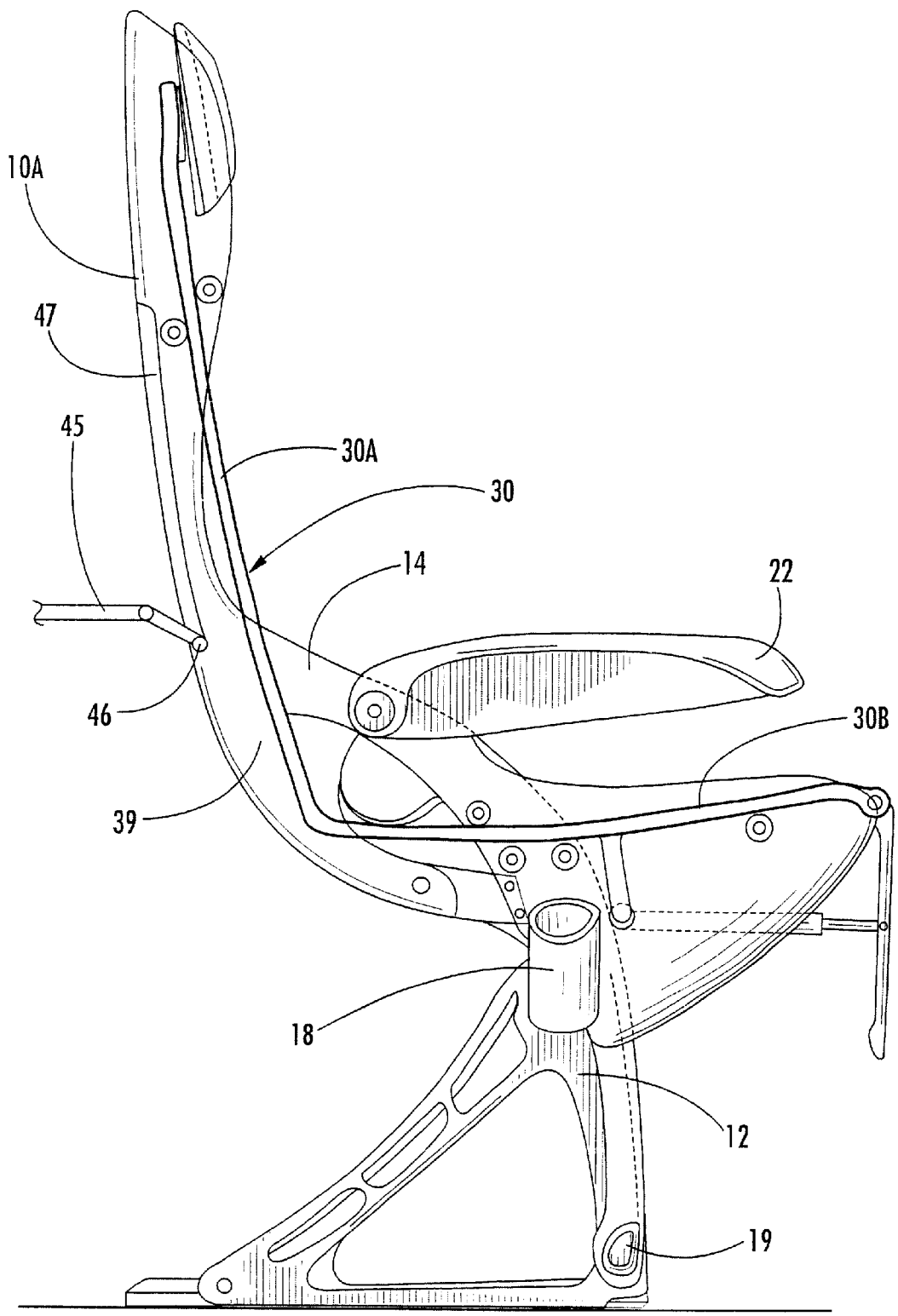
FIG. 2 is a side elevation of the seat assembly shown in FIG. 1, with interior components shown.
Figure 3:
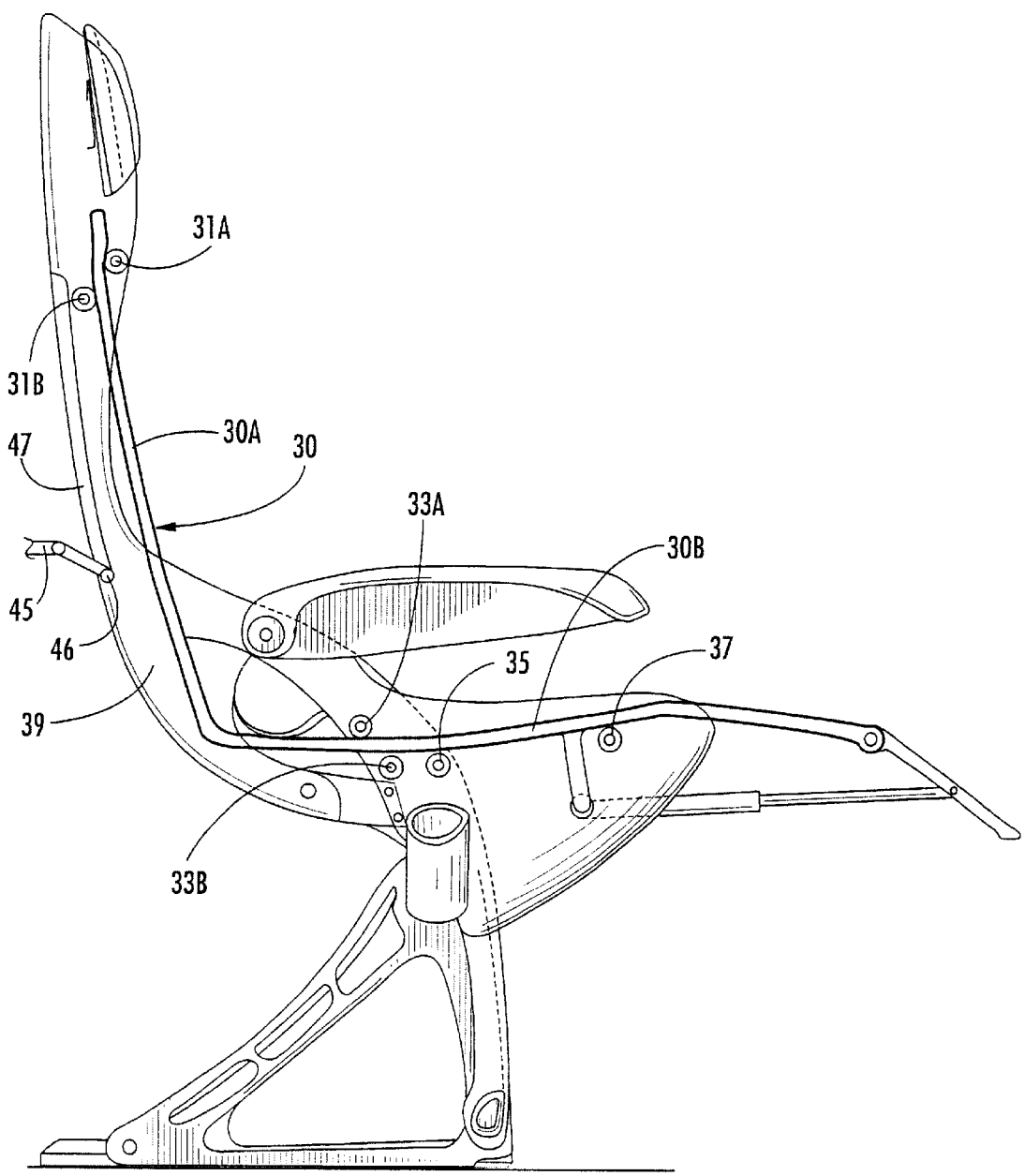
FIG. 3 is a side elevation similar to FIG. 2 with the leg rest extended.
Figure 4:
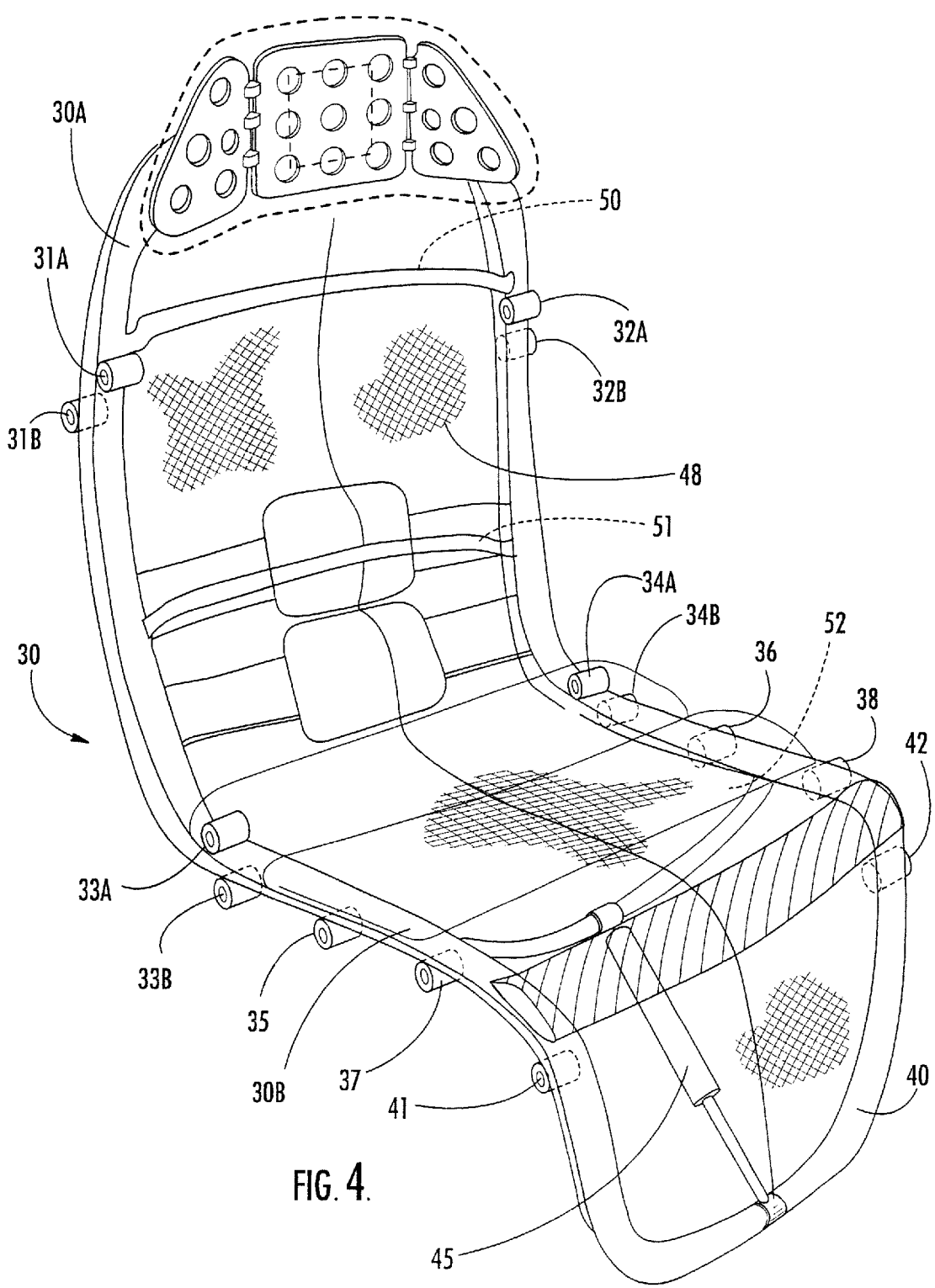
FIG. 4 is a perspective view of a unitary seating element according to a preferred embodiment of the invention.

Referring now to FIGS. 2, 3 and 4, seat 10A, exemplary of each of the seats 10A, 10B, 10C, has a curved, semi-rigid diaphragm support 30 carried by seat frames 14, 15 in alignment with the curved shape of the seat frames 14, 15 and mounted for movement relative to the seat frames 14, 15 between a first, upright position, FIG. 2, and a second, reclined position, FIG. 3. The diaphragm support 30 is preferably made of a controlled flex material, such as a laminated composite carbon fiber resin. This material is well-known as a lightweight, durable and relatively inert material particularly suitable for aircraft use. Other materials having similar characteristics may also be used, including various polymers, particularly including nonflammable polymers. The support 30 is molded into the desired shape using conventional carbon fiber molding and fabrication techniques, and forms a seat back 30A and a seat bottom 30B.

The diaphragm support 30 is mounted on the seat frames 14, 15 by means of sets of cooperating rollers between which the diaphragm support 30 is captured. As is best shown in FIG. 4, rollers 31A,31B and 32A,32B and 33A, 33B and 34A,34B are carried by the seat frames 14, 15 and engage the front and back sides of the diaphragm support 30 to provide roller surfaces against which the diaphragm support 30 rides. The forward portion of the seat bottom is supported by rollers 35, 36 and 37, 38, also carried by the seat frames 14, 15. The foot rest 40 is pivotally-mounted on pivot pins 41, 42 for movement between a retracted position, FIGS. 2 and 4, and an extended position, FIG. 3. The foot rest 40 is extended and retracted by a conventional gas strut.

The diaphragm support 30 is covered by a diaphragm 48 in the form of a fabric seat suspension material such as a material made by DuPont and sold under the trademark Dymetrol 200, or a unidirectional fabric sold under the trademark Crystal Flex, or any other suitable fabric. The material 48 is stretched onto the diaphragm support 30 under tension and provides a seating surface.

As is shown by comparing FIGS. 2 and 3, passenger recline is achieved by translation of the diaphragm support 30 downwardly relative to the seat frames 14, 15. The rollers 31A, 31B, 32A, 32B, 33A, 33B, 34A, 34B, 35, 36, 37 and 38 permit the diaphragm support 30 to translate within a narrow range of motion. The weight of the passenger is sufficient to cause the diaphragm support 30 to slide downwardly. The diaphragm support 30 is locked into position as desired by a piston and cylinder assembly, not shown, positioned under the seat 10A, such as a "Mechlok" linear locking device manufactured by P. L. Porter Controls, Inc. Leg pressure is used to raise and lock the seat in a desired position.

The seats 10A, 10B, 10C are trimmed with a protective and decorative shell 39, within which the structural components and operative elements of the seat are enclosed and protected. A meal tray 45 is mounted on a pivot 46 for movement between a horizontal use position and a vertical stowed position in a recess 47 in the shell 39.

The above-described seat design has the effect of causing the passenger to recline by rotating the passenger about a pivot point in the area of the hips. The passenger's back moves downwardly and the legs move upwardly, maintaining the same relative body position. This provides a more comfortable recline position without the tendency of the passenger to merely slide forward on the seat bottom when the seat back is reclined.

Curved stretchers 50, 51, 52 extend between opposite sides of the diaphragm support 30 and maintain the width of the diaphragm 30 and thus the tension on the diaphragm 48.

Figure 5:
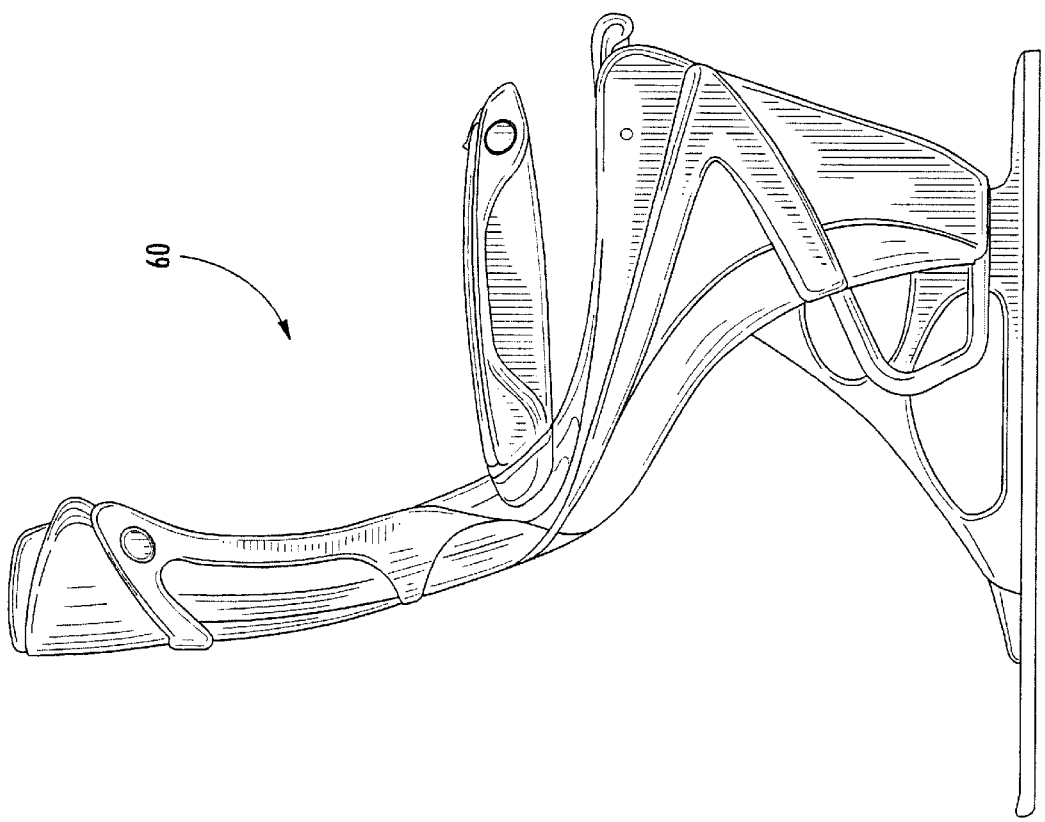
FIG. 5 is a right side elevation of an alternative embodiment of the present invention.
Figure 8:
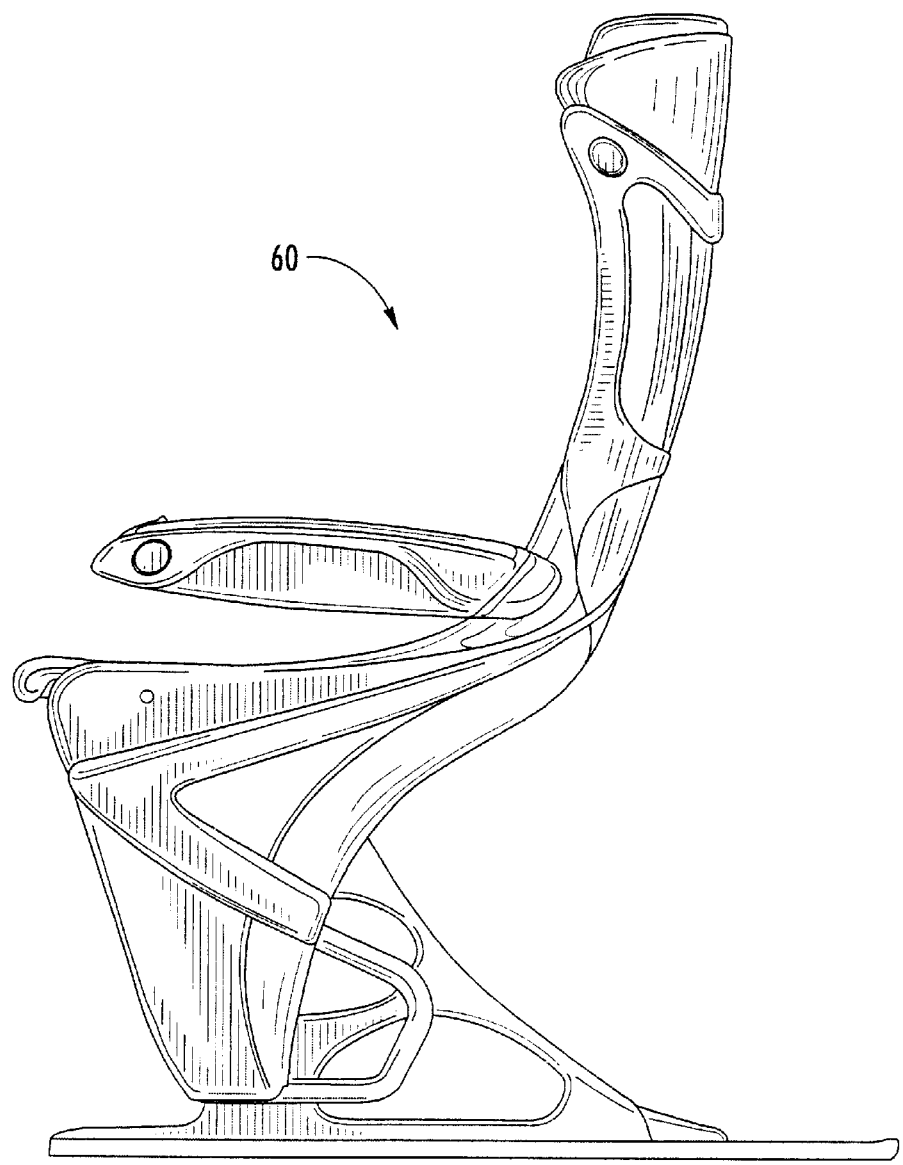
FIG. 8 is a left side elevation of the seat shown in FIG. 5.

An alternative embodiment of the seat 10A is shown in FIGS. 5 and 8 at reference number 60.

Figure 6:
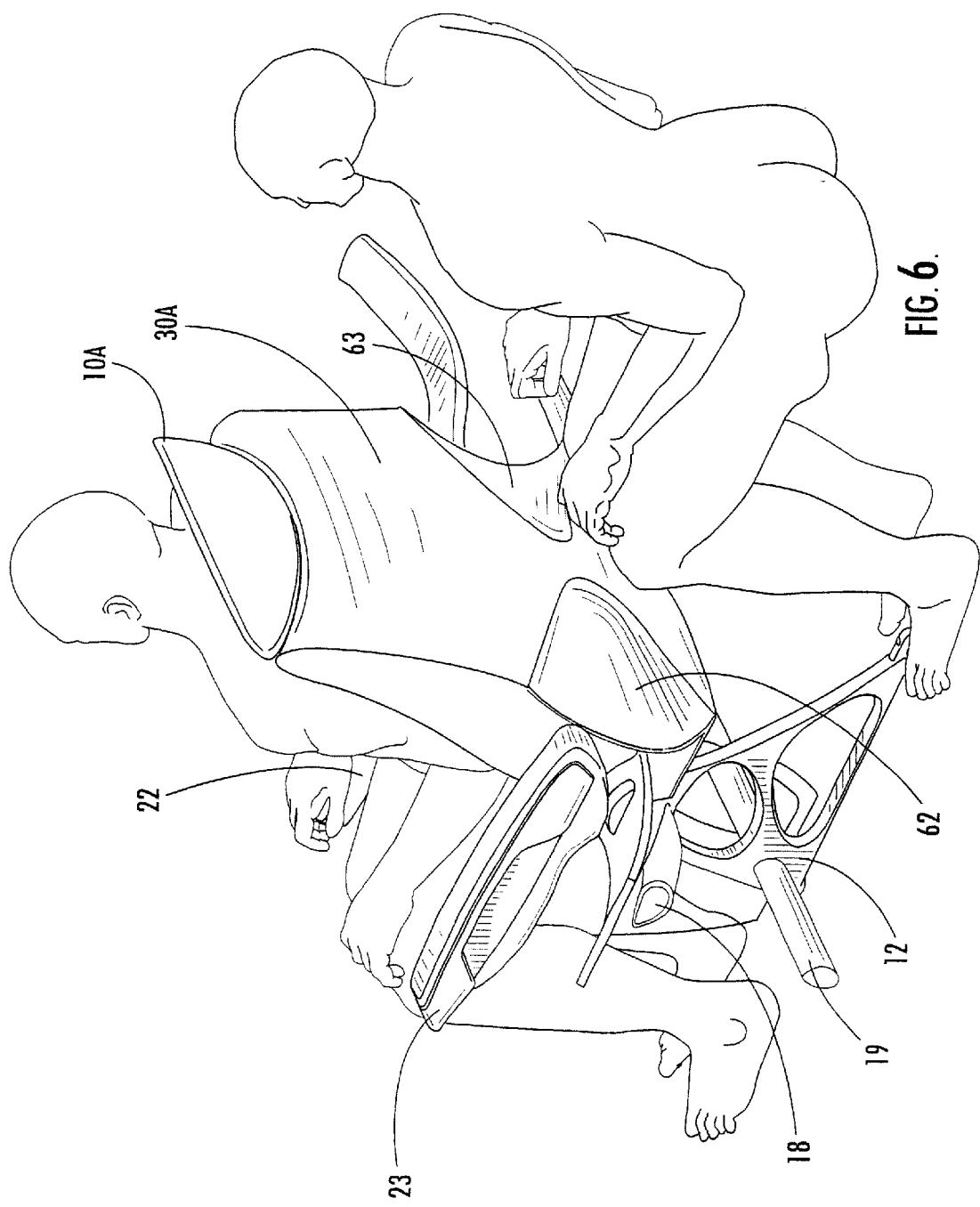
FIG. 6 is a rear perspective view showing the seat arm rest and its relationship to knee room available to an aft-seated passenger, in partial assembly with seating elements removed for clarity.

Referring now to FIG. 6, the view demonstrates features that result from moving the arm rest pivot forwardly and the absence of the aft beam present in prior art seats. As is shown, the pivot of the arm rest 23 is now at a point directly under the elbow of the passenger, and does not extend rearwardly into the plane of the seat back. Without the requirement to provide space between adjacent seat backs for the stowed arm rest to reside, the seat back can be made wider, and the area where the arm rest pivot would normally be positioned can be made available for other uses. As shown in FIG. 6, the seat back 30A includes two concave, inwardly-dished areas 62, 63 that reside forwardly of the knee areas of the aft-seated passenger. These areas provide greater knee clearance for all passengers and particularly for taller passengers whose knees are typically within several inches of the seat back, it not actually touching. This, in combination with the above-described seat back design features that avoid aft movement of the seat back 30A when the passenger reclines the seat, provides an ergonomic design that provides greater comfort for both the forward and the aft-seated passengers.

Figure 7:
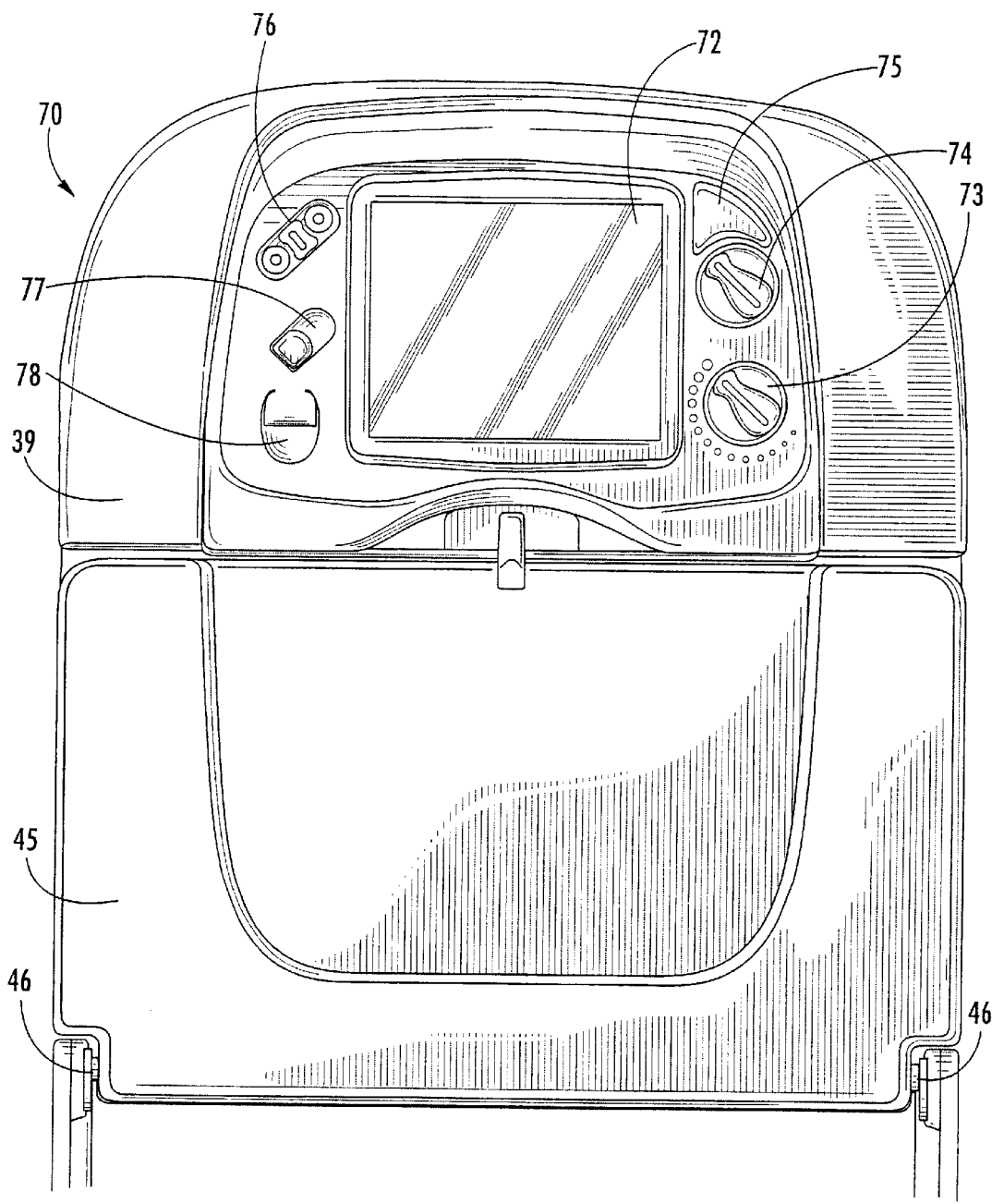
FIG. 7 is a elevation of the rear of a seat back that may be used on a seat according the present invention.

Referring now to FIG. 7, a view of the rear side of a seat back 70 according to one embodiment of the invention is shown. In this particular embodiment, the rear of the seat above the meal tray 45 is provided with a audio/video system that includes a video screen 72. In addition, all of the audio/video controls, the flight attendant call button, reading light, and seat adjustment controls are positioned on the seat back 70 around the video screen 72 in a desired arrangement at reference numerals 73–78. This position is much more accessible than controls that are now often positioned on the inside face of the arm rest where they are hard to see and operate.

Of course, any desired combination of controls can be positioned as shown, with other controls in their conventional positions. Control cables are routed from seat 10A and overhead-positioned features such as lighting to a forward-positioned seat back by a wiring chase positioned on the deck of the aircraft, through the bulkheads. Certain functions may be controlled by a wireless system.

This design illustrates further advantages obtained by maintaining the seat back in a stationary position. The video screen 72 does not move and thus does not require a mechanism to pivot the screen 72 to compensate for movement of the seat back. All of the controls on the seat back 39 are easy to see and reach by the passenger.

Referring now to FIGS. 9 and 10, two further embodiments of seat sets according to the invention are shown at 80 and 100, respectively.

Seat set 80 includes three seats 80A, 80B, 80C mounted on a single curved tubular beam 81, as described above, carried by two leg assemblies 82, 83. The seats 80A, 80B, 80C are also supported by seat frames 84, 85, 86, 87 that carry a baggage guard rail 88. Forward-pivoted arm rests 89, 90, 91 and 92 are carried by the seat frames 84, 85, 86, 87. Concave, inwardly-dished areas 93A, 93B, 94A, 94B, and 95A, 95B, as described above, in the seat back provide additional knee room to the passenger seated aft of the seats 80A, 80B, 80C. Each of the seats 80A, 80B, 80C have a meal tray 97.

Seat set 100 includes three seats 100A, 100B, 100C mounted on a single curved tubular beam 101, as described above, carried by two leg assemblies 102, 103. The seats 100A, 100B, 100C are also supported by seat frames 104, 105, 106, 107 that carry a baggage guard rail 110. Forward-pivoted arm rests 109, 110, 111 and 112 are carried by the seat frames 104, 105, 106, 107. Concave, inwardly-dished areas 113A, 113B, 114A, 114B, and 115A, 115B, as described above, in the seat back provide additional knee room to the passenger seated aft of the seats 100A, 100B, 100C. Each of the seats 100A, 100B, 100C have a meal tray 117.

A passenger seat is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A passenger seat movable from an upright to a recline position without encroaching on an aft-seated passenger, comprising:

(a) a seat base for being attached to a supporting surface; and (b) a unitary seating element, comprising:

(i) a pair of laterally spaced-apart seat frames carried by the seat base, each of said seat frames defining a curved shape corresponding to the profile of an anatomically-appropriate seat bottom and seat back;

(ii) a pair of spaced-apart, curved, semi-rigid diaphragm supports carried by respective seat frames in alignment with the curved shape of the seat frames and mounted for movement relative to the seat frames between a first, upright position and a second, reclined position; and (iii) a diaphragm positioned under tension between the diaphragm supports for providing a continuous seat bottom and seat back support surface for a seat occupant.

2. A passenger seat according to claim 1, and including stretchers attached to and extending between the first and second diaphragm supports for maintaining the diaphragm supports in a spaced-apart condition with the diaphragm in tension.

3. A passenger seat according to claim 1, and including a power assist assembly for providing resistance against movement of the diaphragm supports from the upright to the recline position and a power assist for movement of the diaphragm supports from the recline to the upright position.

4. A passenger seat according to claim 3, wherein said power assist assembly comprises a spring moved into compression as the diaphragm supports move from the upright to the recline position and into extension as the diaphragm supports move from the recline to the upright position.

5. A passenger seat according to claim 1, wherein the pair of diaphragm supports are carried in alignment with the curved shape of the seat frames and mounted for movement relative to the seat frames by a plurality of spaced-part pairs of opposed rollers carried by the seat frames and between which the diaphragm supports are captured for movement therebetween.

6. A passenger seat according to claim 1, and including a lock for locking the diaphragm supports in a desired position.

7. A passenger seat according to claim 1, wherein said diaphragm comprises a fabric.

8. A passenger seat according to claim 1 or 7, wherein said diaphragm supports comprise carbon fiber material.

9. A passenger seat according to claim 1, and including a leg rest assembly mounted proximate a front edge of the seat bottom and movable between a stowed position perpendicular to the seat bottom and a support position extending outwardly from the seat bottom and forming an extension thereof for supporting the legs of the passenger when the seat is in the recline position.

10. A passenger seat according to claim 1, wherein at least two of said seats are attached together side-to-side to form a seat assembly.

\* \* \* \* \*